United States Patent
Tamura

(10) Patent No.: US 10,088,919 B2
(45) Date of Patent: Oct. 2, 2018

(54) POSITION DETECTING DEVICE, POSITION DETECTING SYSTEM, AND CONTROLLING METHOD OF POSITION DETECTING DEVICE

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 510 days.

(21) Appl. No.: 14/598,535

(22) Filed: Jan. 16, 2015

(65) Prior Publication Data

US 2015/0204658 A1 Jul. 23, 2015

(30) Foreign Application Priority Data

Jan. 21, 2014 (JP) ................. 2014-008632
Mar. 25, 2014 (JP) ................. 2014-062263

(51) Int. Cl.
*G01J 5/00* (2006.01)
*G06F 3/0354* (2013.01)
*G06F 3/041* (2006.01)
*G06F 3/042* (2006.01)

(52) U.S. Cl.
CPC ........ *G06F 3/03545* (2013.01); *G06F 3/0416* (2013.01); *G06F 3/0418* (2013.01); *G06F 3/0425* (2013.01)

(58) Field of Classification Search
CPC ...... G06F 3/0425; G06F 3/033; G06F 3/0325; G06F 3/03545; G06F 3/0346; G06F 3/0383
See application file for complete search history.

(56) References Cited

U.S. PATENT DOCUMENTS

| | | | |
|---|---|---|---|
| 6,700,129 B1 * | 3/2004 | Usuda | G06F 3/03545 250/221 |
| 2006/0001654 A1 | 1/2006 | Smits | |
| 2009/0195659 A1 | 8/2009 | Nagata et al. | |
| 2012/0182214 A1 * | 7/2012 | Toyooka | G06F 3/0421 345/156 |
| 2012/0212415 A1 | 8/2012 | Yokobayashi | |
| 2013/0265228 A1 | 10/2013 | Tamura | |
| 2013/0314380 A1 * | 11/2013 | Kuribayashi | G06F 3/0425 345/175 |

FOREIGN PATENT DOCUMENTS

| | | |
|---|---|---|
| CN | 102707796 A | 10/2012 |
| CN | 103365549 A | 10/2013 |
| JP | 2008-505404 A | 2/2008 |
| JP | 2009-181423 A | 8/2009 |
| JP | 2011-227600 A | 11/2011 |

* cited by examiner

*Primary Examiner* — Kenneth J Malkowski
(74) *Attorney, Agent, or Firm* — Oliff PLC

(57) ABSTRACT

A projector includes a light output device outputting detection light on a screen, a position detection unit detecting an indication position, and a calibration control unit. The position detection unit performs a first detecting operation detecting an indication position by using the detection light, and a second detecting operation detecting an indication position by using light other than the detection light. The calibration control unit executes calibration associating a position detected in the second detecting operation with a position on the screen, and restricts output of the detection light while the calibration is executed.

9 Claims, 8 Drawing Sheets

POSITION DETECTING DEVICE, POSITION DETECTING SYSTEM, AND CONTROLLING METHOD OF POSITION DETECTING DEVICE

The entire disclosure of Japanese Patent Application Nos. 2014-008632, filed Jan. 21, 2014 and 2014-062263, filed Mar. 25, 2014 are expressly incorporated by reference herein.

BACKGROUND

1. Technical Field

The present invention relates to a position detecting device, a position detecting system, and a controlling method of a position detecting device.

2. Related Art

In the related art, as a device detecting a manipulation position when input manipulation is performed, a device performing calibration in order to accurately detect a manipulation position is known (for example, refer to JP-A-2011-227600). The device disclosed in JP-A-2011-227600 performs automatic calibration by capturing an image displayed on the manipulation surface. In addition, it is possible to detect the manipulation position, and to perform the calibration by allowing a user to perform manipulation indicating a predetermined point on the manipulation surface.

However, when a plurality of devices of which methods of detecting a manipulation position are different from each other are used in combination with each other, execution of the calibration may be influenced by a difference between the detecting methods.

SUMMARY

An advantage of some aspects of the invention is to combine devices of which methods of detecting a manipulation position are different from each other, and to perform suitable calibration when the manipulation position is detected.

An aspect of the invention is directed to a position detecting device including a light output unit which outputs detection light on a manipulation surface; a detection unit which performs a first detecting operation detecting an indication position by using the detection light, and a second detecting operation detecting an indication position by using light other than the detection light; and a calibration control unit which executes calibration associating a position detected in the second detecting operation with a position on the manipulation surface, in which the calibration control unit restricts output of the detection light while the calibration is executed.

According to the aspect of the invention, when the calibration relevant to the second detecting operation detecting the indication position using the light other than the detection light is performed, the detection light does not influence the calibration. For this reason, in a configuration where the indication position is able to be detected by a plurality of different methods, it is possible to suitably execute the calibration.

Another aspect of the invention is directed to the position detecting device described above, wherein the calibration control unit executes manipulation type calibration associating the position detected in the second detecting operation with the position on the manipulation surface by detecting a real indication position by using the light other than the detection light, and restricts the output of the detection light while the manipulation type calibration is executed.

According to the aspect of the invention, by restricting the output of the detection light while the calibration is executed, it is possible to prevent the detection light from having influenced when the indication position is detected during the calibration. For this reason, in the calibration, it is possible to more accurately and more efficiently detect the indication position.

Still another aspect of the invention is directed to the position detecting device described above, wherein the detection unit detects an indication position of a first indicator in the first detecting operation on the basis of reflected light reflected by the first indicator reflecting the detection light, and detects an indication position of a second indicator in the second detecting operation on the basis of light emitted by the second indicator having a light emitting function.

According to the aspect of the invention, it is possible to detect both of the indication position of the first indicator which does not emit light and the indication position of the second indicator which has the light emitting function by light. Accordingly, a plurality of indicators of which detecting methods are different from each other are used in combination with each other, and thus it is possible to suitably execute the calibration.

Yet another aspect of the invention is directed to the position detecting device described above, wherein the position detecting device is capable of executing a normal operation mode in which the detection unit is operated corresponding to the indication position detected in the first detecting operation and the indication position detected in the second detecting operation, and the position detecting device further includes an output control unit which allows the light output unit to emit light in a light emitting pattern which is different from that of light emission of the second indicator in the normal operation mode.

According to the aspect of the invention, it is possible for the detection unit to discriminate between the reflected light reflected by the first indicator and the light emitted by the second indicator. For this reason, the plurality of indicators of which the detecting methods are different from each other are discriminated between, and are simultaneously used, and thus it is possible to detect the indication position.

Still yet another aspect of the invention is directed to the position detecting device described above, wherein the light output unit emits light other than light of a visible region, and the detection unit detects the indication position on the basis of the light other than light of the visible region emitted by the light output unit and light other than light of a visible region emitted by the second indicator.

According to the aspect of the invention, the light other than light of the visible region is used, and thus it is possible to detect the indication position of the manipulation by the plurality of indicators.

Further another aspect of the invention is directed to the position detecting device described above, wherein the position detecting device is a projector including a projection unit projecting an image onto the manipulation surface.

According to the aspect of the invention, the image is projected onto the manipulation surface, and thus it is possible to detect the indication position of the manipulation with respect to the manipulation surface. In addition, by using the light other than light of the visible region, it is possible to detect the indication position without influencing visibility of a projected image.

Still further another aspect of the invention is directed to the position detecting device described above, wherein the position detecting device further includes an imaging unit capturing the image projected by the projection unit, the calibration control unit executes automatic calibration associating the position detected in the second detecting operation with the position on the manipulation surface on the basis of a captured image captured by the imaging unit in a state in which an image for calibration is projected by the projection unit, and the output of the detection light is not restricted while the automatic calibration is executed.

According to the aspect of the invention, by capturing the image for calibration projected onto the manipulation surface, it is possible to execute the calibration without using the light other than light of the visible region. In this case, the detection light does not influence the calibration, and thus it is possible to simplify the control without restricting the output of the detection light.

Yet further another aspect of the invention is directed to the position detecting device described above, wherein the detection unit detects the reflected light reflected by the first indicator and the light emitted by the second indicator by a common section.

According to the aspect of the invention, it is possible to simplify a configuration of the position detecting device in which the plurality of indicators of which the detecting methods of the indication position are different from each other are able to be used in combination with each other, and thus it is possible to realize cost reduction or improvement in durability.

Still yet further another aspect of the invention is directed to a position detecting system including a position detecting device which detects a manipulation position of a first indicator and a second indicator performing a manipulation on a manipulation surface; and a light output device which outputs detection light on the manipulation surface, in which the position detecting device includes a detection unit which performs a first detecting operation detecting an indication position by using the detection light, and a second detecting operation detecting an indication position by using light other than the detection light, and a calibration control unit which executes calibration associating a position detected in the second detecting operation with a position on the manipulation surface, and the calibration control unit restricts output of the detection light while the calibration is executed.

According to the aspect of the invention, when the calibration relevant to the second detecting operation detecting the indication position using the light other than the detection light is performed, the detection light does not influence the calibration. For this reason, in a configuration where the indication position is able to be detected by a plurality of different methods, it is possible to suitably execute the calibration.

A further aspect of the invention is directed to a controlling method of a position detecting device including outputting detection light on a manipulation surface; and performing a first detecting operation detecting an indication position by using the detection light, and a second detecting operation detecting an indication position by using light other than the detection light; in which calibration associating a position detected in the second detecting operation with a position on the manipulation surface is executed, and output of the detection light is restricted while the calibration is executed.

According to the aspect of the invention, when the calibration relevant to the second detecting operation detecting the indication position using the light other than the detection light is performed, the detection light does not influence the calibration. For this reason, in a configuration where the indication position is able to be detected by a plurality of different methods, it is possible to suitably execute the calibration.

According to the aspects of the invention, in a configuration where the indication position is able to be detected by a plurality of different methods, it is possible to suitably execute the calibration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

Figure 1:
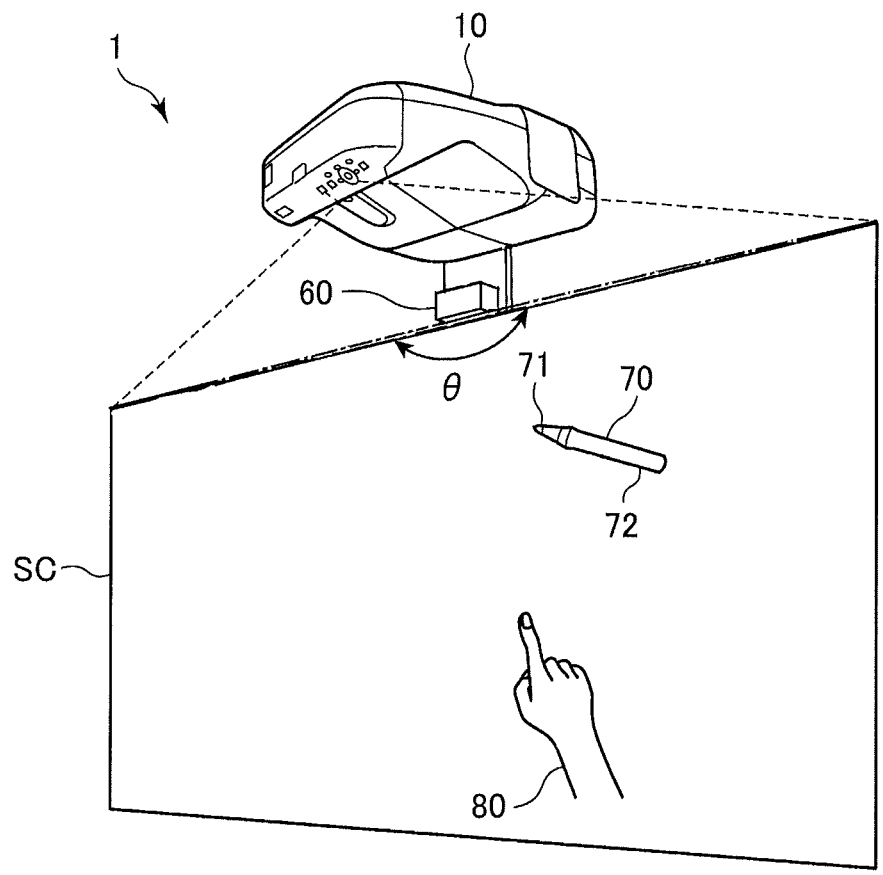
FIG. 1 is a schematic configuration diagram of a projection system according to an embodiment.

FIG. 1 is a diagram illustrating a configuration of a projection system 1 according to an embodiment to which the invention is applied. The projection system 1 includes a projector 10 disposed above a screen SC (a projection surface, a manipulation surface), and a light output device 60 (a light output unit) disposed on an upper portion of the screen SC.

The projector 10 is disposed immediately above or obliquely above the screen SC, and projects an image toward the obliquely downward screen SC. In addition, the screen SC exemplified in this embodiment is a flat plate or a curtain which is fixed to a wall surface, or is erected on a floor surface. The invention is not limited to this example, and the wall surface is able to be used as the screen SC. In this case, the projector 10 and the light output device 60 may be attached to an upper portion of the wall surface which is used as the screen SC.

The projector 10 is connected to an external image supply device such as a personal computer (PC), a video reproducing device, and a DVD reproducing device, and projects an image onto the screen SC on the basis of analog image signals or digital image data supplied from the image supply device. In addition, the projector 10 may have a configuration in which image data stored in an embedded storage unit 110 (FIG. 2) or in an externally connected storage medium is read out, and the image is displayed on the screen SC on the basis of the image data.

The light output device 60 is provided with a light source unit 61 (FIG. 2) including a solid light source, and outputs (emits) light emitted from the light source unit 61 by diffusing the light along the screen SC. An output range of the light output device 60 is illustrated by an angle θ in FIG. 1. The light output device 60 is disposed above the upper end of the screen SC and outputs the light downwardly in a range of the angle θ, and the light forms a layer of light along the screen SC. In this embodiment, the angle θ is approximately 180 degrees, and thus the layer of the light is formed over approximately the entire screen SC. It is preferable that a front surface of the screen SC and the layer of the light be close to each other, and in this embodiment, a distance between the front surface of the screen SC and the layer of the light is in a range of approximately 1 mm to 10 mm.

The light output by the light output device 60 is light other than light of a visible region, and is infrared light in this embodiment.

When indication manipulation is performed with respect to the screen SC, the projection system 1 detects an indication position by the projector 10.

As an indicator used in the indication manipulation, a pen type indicator 70 is able to be used. A tip portion 71 of the indicator 70 has a manipulation switch 75 (FIG. 2) embedded therein which is operated at the time of being pressed, and thus when manipulation of pressing the tip portion 71 against the wall or the screen SC is performed, the manipulation switch 75 is turned ON. A user holds a rod-like shaft portion 72 by a hand, manipulates the indicator 70 such that the tip portion 71 is in contact with the screen SC, and manipulates the indicator 70 such that the tip portion 71 is pressed against the screen SC. The tip portion 71 is provided with a transmission and reception unit 74 (FIG. 2) emitting light. The projector 10 detects a position of the tip portion 71 as the indication position on the basis of the light emitted by the indicator 70. The light emitted by the indicator 70 is light other than light of a visible region, and is infrared light in this embodiment.

In addition, when position indication manipulation is performed by an indicator 80 which is a finger of the user, the user brings the finger in contact with the screen SC. In this case, a position at which the indicator 80 is in contact with the screen SC is detected.

That is, when a tip of the indicator 80 (for example, a fingertip) is in contact with the screen SC, the layer of the light formed by the light output device 60 is blocked. At this time, the light output by the light output device 60 is reflected by the indicator 80, and a part of the reflected light progresses toward the projector 10 from the indicator 80. The projector 10 has a function of detecting light from the screen SC side, that is, light from a lower side by a position detection unit 50 described later, and thus it is possible to detect the reflected light from the indicator 80. The projector 10 detects the reflected light reflected by the indicator 80, and thus detects the indication manipulation of the indicator 80 with respect to the screen SC. In addition, the projector 10 detects the indication position indicated by the indicator 80.

The layer of the light output by the light output device 60 is close to the screen SC, and thus a position at which the light is reflected by the indicator 80 is able to be considered as a tip which is closest to the screen SC or as the indication position. For this reason, it is possible to specify the indication position on the basis of the reflected light from the indicator 80.

The projection system 1 functions as an interactive white board system, detects the indication manipulation which is performed by the user using the indicators 70 and 80, and reflects the indication position in a projected image.

Specifically, the projection system 1 performs a process of drawing a figure at the indication position or arranging a character or a symbol at the indication position, a process of drawing a figure along a trajectory of the indication position, a process of erasing the drawn figure or the arranged character or symbol, and the like. In addition, the figure drawn on the screen SC, and the character or the symbol arranged on the screen SC are able to be stored as the image data, and are able to be output to an external device.

Further, the projection system 1 may be operated as a pointing device by detecting the indication position, and may output coordinates of the indication position in the image projection region in which the projector 10 projects the image onto the screen SC. In addition, the projection system 1 may perform Graphical User Interface (GUI) manipulation by using the coordinates.

Figure 2:
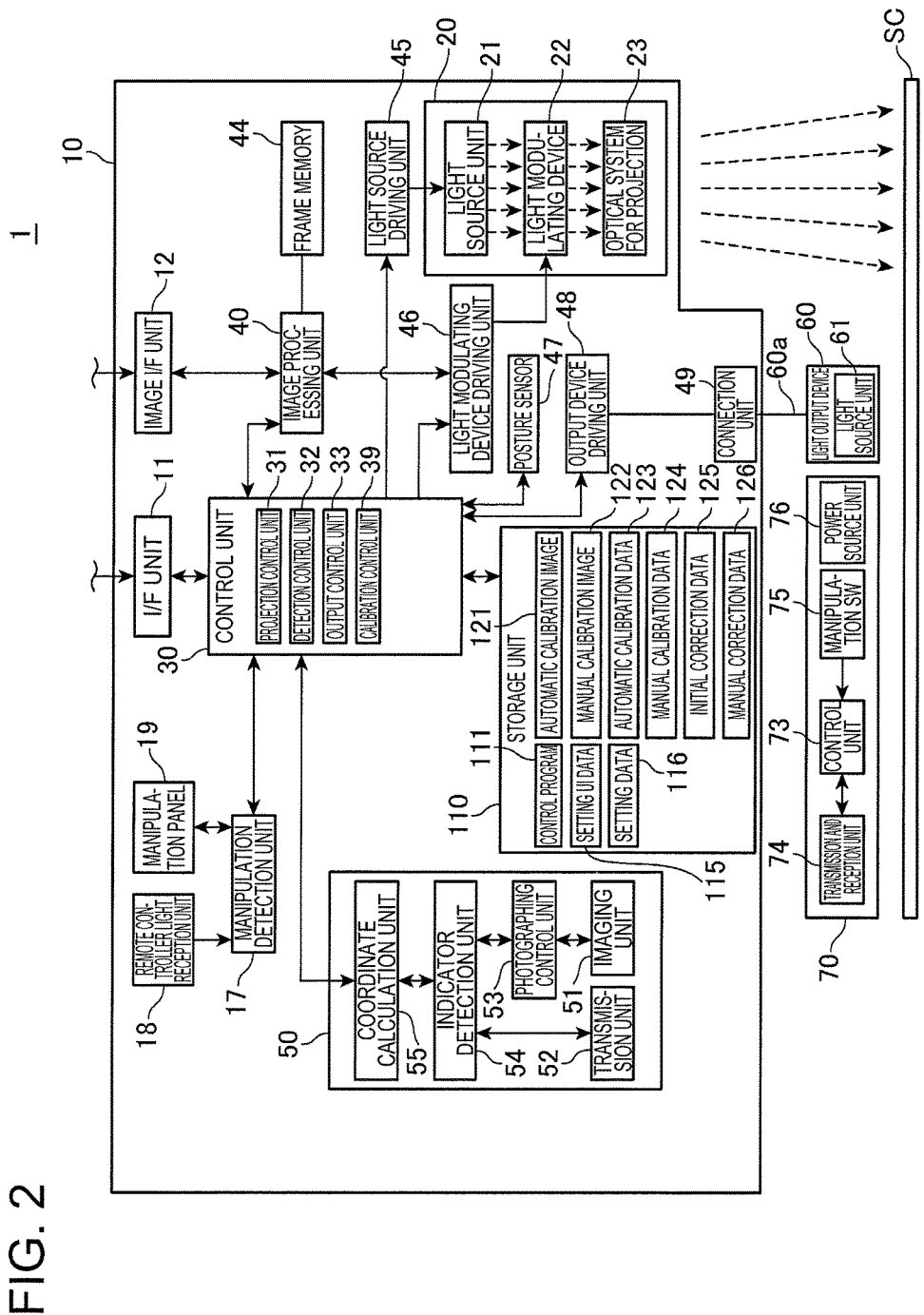
FIG. 2 is a functional block diagram of the projection system.

FIG. 2 is a functional block diagram of each unit configuring the projection system 1.

The projector 10 includes an interface (I/F) unit 11 and an image interface (I/F) unit 12 as an interface connected to the external device. The I/F unit 11 and the image I/F unit 12 may include a connector for wired connection, and may include an interface circuit corresponding to the connector. In addition, the I/F unit 11 and the image I/F unit 12 may include a wireless communication interface. As the connector for wired connection and the interface circuit, a wired LAN, IEEE1394, a USB, and the like are included. In addition, as the wireless communication interface, a wireless LAN, Bluetooth (registered trademark), and the like are included. As the image I/F unit 12, an interface for image data such as an HDMI (registered trademark) interface is able to be used. The image I/F unit 12 may include an interface into which sound data is input.

The I/F unit 11 is an interface which transmits and receives various data items between the I/F unit 11 and external devices such as a PC. The I/F unit 11 inputs and outputs control data relevant to image projection, setting data setting an operation of the projector 10, coordinate data of the indication position detected by the projector 10, and the like. A control unit 30 described later has a function of transmitting and receiving data with respect to the external device through the I/F unit 11.

The image I/F unit 12 is an interface into which the digital image data is input. The projector 10 of this embodiment projects the image on the basis of the digital image data input through the image I/F unit 12. Furthermore, the projector 10 may have a function of projecting the image on the basis of an analog image signal, and in this case, the image I/F unit 12 may include an analog image interface and an A/D conversion circuit converting the analog image signal into digital image data.

The projector 10 includes a projection unit 20 forming an optical image. The projection unit 20 includes a light source unit 21, a light modulating device 22, and an optical system for projection 23. The light source unit 21 includes a light source such as a xenon lamp, an ultrahigh pressure mercury lamp, a Light Emitting Diode (LED), or a laser light source. In addition, the light source unit 21 may include a reflector and an auxiliary reflector which guide light emitted by the light source to the light modulating device 22. Further, the light source unit 21 may include a lens group (not illustrated) for improving an optical property of projection light, a polarization plate, and a light control element for reducing light intensity of the light emitted by the light source on a path leading to the light modulating device 22 may be provided.

The light modulating device 22, for example, includes three transmission-type liquid crystal panels corresponding to three primary colors of RGB, modulates light being transmitted through the liquid crystal panel, and creates image light. The light from the light source unit 21 is divided into three colored light rays of RGB, and each of the color light rays is incident on each of the corresponding liquid crystal panels. The color light which is modulated by passing through each of the liquid crystal panels is synthesized by a synthesis optical system such as a cross dichroic prism, and is emitted to the optical system for projection 23.

The optical system for projection 23 includes a lens group which guides the image light modulated by the light modulating device 22 in a screen SC direction, and forms an image on the screen SC. In addition, the optical system for projection 23 may include a zoom mechanism adjusting magnification and reduction, and a focal point of the projected image on the screen SC, and a focus adjustment mechanism adjusting a focus. When the projector 10 is a short focus lens type projector, the optical system for projection 23 may be provided with a concave mirror reflecting the image light toward the screen SC.

A light source driving unit 45 turning the light source unit 21 on according to control of the control unit 30, and a light modulating device driving unit 46 operating the light modulating device 22 according to the control of the control unit 30 are connected to the projection unit 20. The light source driving unit 45 may switch between turning on and turning off of the light source unit 21, and may have a function of adjusting light intensity of the light source unit 21.

The projector 10 includes an image processing system processing the image projected by the projection unit 20. The image processing system includes the control unit 30 controlling the projector 10, a storage unit 110, a manipulation detection unit 17, an image processing unit 40, a light source driving unit 45, and a light modulating device driving unit 46. In addition, a frame memory 44 is connected to the image processing unit 40, and a posture sensor 47, an output device driving unit 48, and a position detection unit 50 are connected to the control unit 30. Each portion may be included in the image processing system.

The control unit 30 controls each of the units of the projector 10 by executing a predetermined control program 111. The storage unit 110 stores the control program 111 executed by the control unit 30, and data processed by the control unit 30 in a non-volatile manner. The storage unit 110 stores setting screen data 112 of the screen for setting the operation of the projector 10, and setting data 113 indicating contents set by using the setting screen data 112.

The image processing unit 40 processes the image data input through the image I/F unit 12 according to the control of the control unit 30, and outputs the image signal to the light modulating device driving unit 46. A process executed by the image processing unit 40 is a determination process of a three-dimensional (3D) image and a two-dimensional (2D) image, a resolution conversion process, a frame rate conversion process, a distortion correction process, a digital zoom process, a color hue correction process, a brightness correction process, and the like. The image processing unit 40 executes a process designated by the control unit 30, and performs the process by using parameters input from the control unit 30, as necessary. In addition, a plurality of processes among the processes described above may be executed in combination with each other.

The image processing unit 40 is connected to the frame memory 44. The image processing unit 40 develops the image data input from the image input I/F12 in the frame memory 44, and executes various processes described above with respect to the developed image data. The image processing unit 40 reads out the processed image data from the frame memory 44, creates image signals R, G, and B corresponding to the image data, and outputs the signals to the light modulating device driving unit 46.

The light modulating device driving unit 46 is connected to the liquid crystal panel of the light modulating device 22. The light modulating device driving unit 46 drives the liquid crystal panel on the basis of the image signal input from the image processing unit 40, and draws an image on each of the liquid crystal panels.

The manipulation detection unit 17 is connected to a remote controller light reception unit 18 and a manipulation panel 19 which function as an input device, and detects manipulation through the remote controller light reception unit 18 and the manipulation panel 19.

The remote controller light reception unit 18 receives an infrared signal transmitted corresponding to button manipulation by a remote controller (not illustrated) which is used by the user of the projector 10. The remote controller light reception unit 18 decodes the infrared signal received from the remote controller, creates manipulation data indicating manipulation contents of the remote controller, and outputs the data to the control unit 30.

The manipulation panel 19 is disposed on an outside case body of the projector 10, and includes various switches and indicator lamps. The manipulation detection unit 17 suitably turns an indicator lamp of the manipulation panel 19 on and off in accordance with an operation state or a setting state of the projector 10 according to the control of the control unit 30. When a switch of the manipulation panel 19 is manipulated, the manipulation data corresponding to the manipulated switch is output from the manipulation detection unit 17 to the control unit 30.

The output device driving unit 48 is connected to the light output device 60 through a connection unit 49. The connection unit 49, for example, is a connector including a plurality of pins, and the light output device 60 is connected to the connection unit 49 through a cable 60a. The output device driving unit 48 creates a pulse signal according to the control of the control unit 30, and outputs the signal to the light output device 60 through the connection unit 49. In addition, the output device driving unit 48 supplies power to the light output device 60 through the connection unit 49.

The light output device 60 contains the light source unit 61 and an optical component in a box-like case as illustrated in FIG. 1. The light output device 60 of this embodiment includes a solid light source 62 emitting infrared light in the light source unit 61. The infrared light emitted by the solid light source 62 is diffused by a collimating lens and a Powell lens, and forms a surface along the screen SC. In addition, the light source unit 61 includes a plurality of solid light sources, each light emitted by the plurality of solid light sources is diffused, and thus the layer of the light may be formed to cover an image projection range of the screen SC. In addition, the light output device 60 may include an adjustment mechanism adjusting a distance or an angle between the layer of the light emitted by the light source unit 61 and the screen SC.

The light output device 60 turns the light source unit 61 on by the pulse signal and the power supplied from the output device driving unit 48. The output device driving unit 48 controls a turning on timing and a turning off timing of the light source unit 61. The control unit 30 controls the output device driving unit 48, and turns the light source unit 61 on by being synchronized with a capturing timing of an imaging unit 51 described later.

The position detection unit 50 (a detection unit) detects manipulation with respect to the screen SC by the indicators 70 and 80. The position detection unit 50 includes each unit of the imaging unit 51, a transmission unit 52, a capturing control unit 53, an indicator detection unit 54, and a coordinate calculation unit 55.

The imaging unit 51 includes an imaging optical system, an imaging element, an interface circuit, and the like, and captures a projection direction of the optical system for projection 23. The imaging optical system of the imaging unit 51 is arranged in a direction approximately similar to that of the optical system for projection 23, and has a field angle covering a range in which the optical system for projection 23 projects an image onto the screen SC. In addition, as the imaging element, a CCD or a CMOS which receives light of an infrared region and a visible light region is included. The imaging unit 51 may include a filter blocking a part of the light which is incident on the imaging element, and for example, when the infrared light is received, a filter mainly transmitting the light of the infrared region may be arranged in front of the imaging element. In addition, the interface circuit of the imaging unit 51 reads out a detected value of the imaging element, and outputs the value.

The capturing control unit 53 creates captured image data by executing the capturing by the imaging unit 51. When the imaging element performs the capturing by visible light, an image projected onto the screen SC is captured. For example, an image of automatic calibration described later is captured using visible light. In addition, the capturing control unit 53 is able to capture the infrared light by the imaging unit 51, and the infrared light (the infrared signal) emitted by the indicator 70 and the reflected light reflected by the indicator 80 are captured in the image in this case.

The indicator detection unit 54 detects the indication position of the indicators 70 and 80 on the basis of the captured image data captured by the capturing control unit 53. The indicator detection unit 54 detects an image of the infrared light emitted by the indicator 70 and/or an image of the reflected light reflected by the indicator 80 from the captured image data when the capturing control unit 53 executes the capturing of the infrared light by the imaging unit 51. Further, the indicator detection unit 54 may determine whether the detected image is an image of the light emitted by the indicator 70 or an image of the reflected light from the indicator 80.

The coordinate calculation unit 55 calculates coordinates of the indication position of the indicators 70 and 80 in the captured image data on the basis of a position in the image detected by the indicator detection unit 54, and outputs the coordinates to the control unit 30. In addition, the coordinate calculation unit 55 may calculate the coordinates of the indication position of the indicators 70 and 80 in the projected image projected by the projection unit 20, and may output the coordinates to the control unit 30. Further, the coordinate calculation unit 55 may calculate the coordinates of the indication position of the indicators 70 and 80 in the image data drawn in the frame memory 44 by the image processing unit 40 and the coordinates of the indication position of the indicators 70 and 80 in the input image data of the image I/F unit 12.

The transmission unit 52 transmits the infrared signal to the indicator 70 according to control of the indicator detection unit 54. The transmission unit 52 includes a light source such as an infrared LED, and turns the light source on and off according to the control of the indicator detection unit 54.

In addition, the indicator 70 includes a control unit 73, a transmission and reception unit 74, a manipulation switch 75, and a power source unit 76, and each unit is contained in the shaft portion 72 (FIG. 1). The control unit 73 is connected to the transmission and reception unit 74 and the manipulation switch 75, and an ON and OFF state of the manipulation switch is detected. The transmission and reception unit 74 includes a light source such as an infrared LED, and a light receiving element receiving infrared light, turns the light source on and off according to control of the control unit 73, and outputs a signal indicating a light receiving state of the light receiving element to the control unit 73.

The power source unit 76 includes a dry-cell battery or a secondary battery as a power source, and supplies electric power to each unit of the control unit 73, the transmission and reception unit 74, and the manipulation switch 75.

The indicator 70 may include a power source switch which turns power supply from the power source unit 76 ON and OFF.

Here, a method of specifying the indicator 70 from the captured image data of the imaging unit 51 by mutual communication between the position detection unit 50 and the indicator 70 will be described.

When the position indication manipulation is detected by the indicator 70, the control unit 30 controls the indicator detection unit 54 such that a signal for synchronization is transmitted from the transmission unit 52. That is, the indicator detection unit 54 turns the light source of the transmission unit 52 on at predetermined intervals according to the control of the control unit 30. The infrared light periodically emitted by the transmission unit 52 functions as a synchronized signal which synchronizes the position detection unit 50 with the indicator 70.

On the other hand, the control unit 73 allows the transmission and reception unit 74 to receive the infrared light emitted by the transmission unit 52 of the projector 10 after supply of the power from the power source unit 76 is started and a predetermined initialization operation is performed. When the control unit 73 allows the transmission and reception unit 74 to receive the infrared light periodically emitted by the transmission unit 52, the control unit 73 turns (emits) the light source of the transmission and reception unit 74 on with a lighting pattern which is set in advance by being synchronized with a timing of the infrared light. The lighting pattern turns the light source on and off according to data indicating ON and OFF, and indicates data intrinsic to the indicator 70. The control unit 73 turns the light source on and off according to a turning on time and a turning off time of the set pattern. The control unit 73 repeatedly executes the pattern described above during the power is supplied from the power source unit 76.

That is, the position detection unit 50 periodically transmits an infrared signal for synchronization to the indicator 70, and the indicator 70 transmits the infrared signal which is set in advance by being synchronized with the infrared signal transmitted by the position detection unit 50.

The capturing control unit 53 of the position detection unit 50 performs control of matching a capturing timing of the imaging unit 51 with a turning on timing of the indicator 70. The capturing timing is determined on the basis of a turning on timing of the transmission unit 52 by the indicator detection unit 54. The indicator detection unit 54 is able to specify a pattern turned on by the indicator 70 according to whether or not a light image of the indicator 70 is captured in the captured image data of the imaging unit 51.

The pattern turned on by the indicator 70 is able to include a pattern intrinsic to each indicator 70, or a common pattern of a plurality of indicators 70 and a pattern intrinsic to each indicator 70. In this case, when the image of the infrared light emitted by the plurality of indicators 70 is included in the captured image data, the indicator detection unit 54 is able to discriminate between each of images as images of the different indicators 70.

In addition, the control unit 30 controls the output device driving unit 48 such that the turning on timing of the light source unit 61 is synchronized with the capturing timing of the imaging unit 51. In a case where the light source unit 61 is pulse-lit according to the capturing timing of the imaging unit 51, the reflected light from the indicator 80 is captured in the captured image of the imaging unit 51 when the indicator 80 indicates the screen SC. When the light source unit 61 is turned on in a pattern which is able to be discriminated from the turning on timing of the indicator 70, the indicator detection unit 54 is able to determine whether the image captured in the captured image data is the indicator 70 or the indicator 80. The turning on timing of the light source unit 61 will be described later with reference with FIG. 8.

Further, the control unit 73 included in the indicator 70 switches a pattern turning on the transmission and reception unit 74 according to a manipulation state of the manipulation switch 75. For this reason, the indicator detection unit 54 is able to determine whether or not a manipulation state of the indicator 70, that is, the tip portion 71 is pressed against the screen SC on the basis of a plurality of captured image data items.

The posture sensor 47 is configured by an acceleration sensor, a gyro sensor, and the like, and outputs a detected value to the control unit 30. The posture sensor 47 is fixed such that a disposing direction of the projector 10 is able to be identified with respect to a main body of the projector 10.

The projector 10 is able to be used, in addition to in an installation state where the projector 10 is suspended from a wall surface or a ceiling surface as illustrated in FIG. 1, in an installation state where projection is performed from a lower portion of the screen SC, and in an installation state where a horizontal surface such as a top surface of a desk is used as the screen SC. The installation state of the projector 10 may not be suitable for using the light output device 60. For example, when projection is performed with respect to the screen SC from a portion beneath thereof, a body of the user may block the output light of the light output device 60, and thus it is not suitable. The posture sensor 47 is disposed in the main body of the projector 10 such that a plurality of installation states which are considered as the installation state of the projector 10 are able to be identified. The posture sensor 47, for example, is configured by using a biaxial gyro sensor, a monoaxial gyro sensor, an acceleration sensor, and the like. The control unit 30 is able to automatically determine the installation state of the projector 10 on the basis of an output value of the posture sensor 47. When the control unit 30 determines that the installation state is not suitable for using the light output device 60, for example, the output device driving unit 48 stops output of a power supply voltage or a pulse signal.

The control unit 30 reads out and executes the control program 111 stored in the storage unit 110, and thus realizes functions of the projection control unit 31, the detection control unit 32, the output control unit 33, and the calibration control unit 39, and controls each unit of the projector 10.

The projection control unit 31 acquires contents of the manipulation performed by the user on the basis of the manipulation data input from the manipulation detection unit 17. The projection control unit 31 controls the image processing unit 40, the light source driving unit 45, and the light modulating device driving unit 46 according to the manipulation performed by the user, and projects an image onto the screen SC. The projection control unit 31 controls the image processing unit 40, and executes the determination process of the three-dimensional (3D) image and the two-dimensional (2D) image, the resolution conversion process, the frame rate conversion process, the distortion correction process, the digital zoom process, the color hue correction process, the brightness correction process, and the like which are described above. In addition, the projection control unit 31 controls the light source driving unit 45 according to the process of the image processing unit 40, and controls light intensity of the light source unit 21.

The detection control unit 32 controls the position detection unit 50, executes detection of the manipulation position of the indicators 70 and 80, and acquires the coordinates of the manipulation position. In addition, the detection control unit 32 acquires the coordinates of the manipulation position, data identifying whether the manipulation position is the manipulation position of the indicator 70 or the manipulation position of the indicator 80 and data indicating the manipulation state of the manipulation switch 75. The detection control unit 32 executes a process which is set in advance on the basis of the acquired coordinates and data. For example, a process in which a figure is drawn by the image processing unit 40 on the basis of the acquired coordinates, and the drawn figure overlaps with an input image input into the image I/F unit 12 to be projected is performed. In addition, the detection control unit 32 may output the acquired coordinates to an external device such as a PC which is connected to the I/F unit 11. In this case, the detection control unit 32 may output the acquired coordinates by converting the acquired coordinates into a data format which is recognized as an input for a coordinate input device in an operating system of the external device connected to the I/F unit 11. For example, when a PC operated in a Windows (registered trademark) operating system is connected to the I/F unit 11, data which is processed as input data of a Human Interface Device (HID) in an operating system is output. In addition, the detection control unit 32 may output coordinate data, the data identifying whether the manipulation position is the manipulation position of the indicator 70 or the manipulation position of the indicator 80, and the data indicating the manipulation state of the manipulation switch 75.

In addition, the detection control unit 32 controls position detection using the indicator 80. Specifically, the detection control unit 32 determines whether or not the light output device 60 is able to be used on the basis of connection or disconnection of the light output device 60. When the light output device 60 is not able to be used, the detection control unit 32 sets the light output device 60 not to be used. Here, the detection control unit 32 may notify that the light output device 60 is not able to be used.

The output control unit 33 controls the output device driving unit 48, and executes or stops the output of the power and the pulse signal with respect to the light output device 60 connected to the connection unit 49. When the light output device 60 is not able to be used or is not used according to the control of the detection control unit 32, the output control unit 33 stops the output of the power and the pulse signal of the output device driving unit 48. In addition, when the light output device 60 is used, the output control unit 33 outputs the power and the pulse signal of the output device driving unit 48.

The calibration control unit 39 detects the indication position of the indicator 70 and the indicator 80, and executes calibration for converting the indication position into the coordinates in the input image of the image I/F unit 12.

A processing procedure of the control unit 30, and in particular, a processing procedure of the calibration control unit 39 will be described with reference to a flowchart of FIG. 3 and the respective drawings.

The calibration is executed as one of the initial settings when the projector 10 is initially used. The calibration is a process in which a position in the image drawn in the frame memory 44 and projected by the projection unit 20, and a position on the captured image data captured by the imaging unit 51 are associated with each other. The indication position of the indicators 70 and 80 detected by the position detection unit 50 from the captured image data is the position in the captured image data, and for example, is indicated by coordinates in a coordinate system set in the captured image. The user performs indication with the indicators 70 and 80 with consideration of the projected image projected onto the screen SC. Accordingly, it is necessary that the projector 10 specify the indication position with respect to the projected image on the screen SC. By the calibration, it is possible to convert the coordinates of the position detected on the captured image data into the coordinates on the projected image data. Data of this association is calibration data. The calibration data is data associating the coordinates on the captured image data output by the capturing control unit 53 with the coordinates on the projected image. Specifically, a table associating the coordinates on the captured image data with the coordinates on the projected image on a one-to-one basis may be used, and a function of converting the coordinates on the captured image data into the coordinates on the projected image may be used.

The calibration control unit 39 executes the calibration according to a type of the indicator. That is, calibration relevant to the detection of the indication position of the indicator 70 and calibration relevant to the detection of the indication position of the indicator 80 are executed.

Figure 4A:
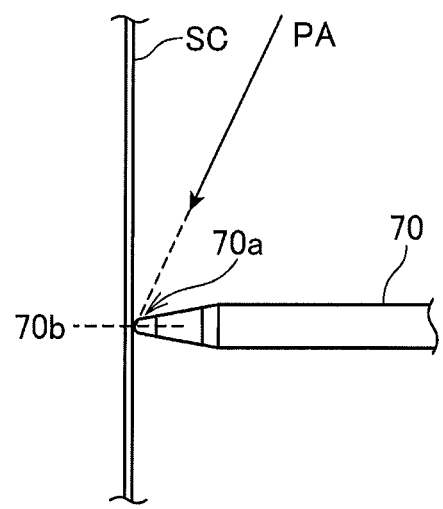
FIGS. 4A and 4B are explanatory diagrams illustrating an aspect of detecting an indication position of an indicator.
Figure 4B:
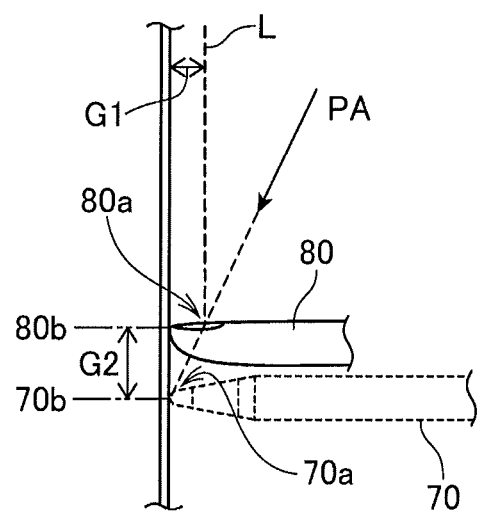

FIGS. 4A and 4B are explanatory diagrams illustrating an aspect of detecting the indication position of the indicators 70 and 80, FIG. 4A illustrates an aspect of detecting the indication position of the indicator 70, and FIG. 4B illustrates an aspect of detecting the indication position of the indicator 80.

In FIG. 4A, a capturing direction in which the imaging unit 51 captures the screen SC is indicated by PA. When the position detection of the indicator 70 is performed, the transmission and reception unit 74 outputs the infrared light from the light emitting position 70a on a tip of the indicator 70. The light emitting position 70a is extremely close to a contact point 70b at which the indicator 70 is in contact with the screen SC. For this reason, when an image of the light emitted by the indicator 70 is detected from the captured image data which is captured from the capturing direction PA, a position in the image is able to be considered as a position of the contact point 70b.

In contrast, as illustrated in FIG. 4B, when the indication position of the indicator 80 is detected, detection light L allows detection of the reflected light reflected by the indicator 80. That is, the image of the reflected light of the detection light L is detected from the captured image data which is captured from the capturing direction PA. An output direction of the detection light L is approximately parallel with the screen SC, and the detection light L is separated from the screen SC by a predetermined distance (hereinafter, referred to as a "distance G1"). The distance G1 changes according to an attachment position of the light output device 60 with respect to the screen SC, and in terms of the structure, it is difficult to set the distance G1 to 0. For this reason, on the tip of the indicator 80, the image of the reflected light reflected at a reflection position 80a which is separated from the screen SC by the distance G1 is captured in the captured image data captured from the capturing direction PA.

As illustrated in FIG. 4B, the reflection position 80a is separated in an oblique direction with respect to the capturing direction PA. For this reason, in the capturing direction PA, the position in the image of the reflected light captured in the captured image data is the same position as that in an image when a position which is further away is indicated by the indicator 70. That is, the reflected light when the indicator 80 is in contact with the screen SC at the contact point 80b, and the light when the indicator 70 is in contact with the screen SC at the contact point 70b are captured in the same position in the captured image data of the imaging unit 51. For this reason, the contact point 80b indicated by the indicator 80 is detected as the contact point 70b separated from the imaging unit 51 in the capturing direction PA, and a shift of distance G2 occurs.

The imaging unit 51 performs the capturing obliquely from the position separated from the screen SC, and thus the shift of the distance G2 is caused. For example, a positional relationship between the capturing direction PA and the indicators 70 and 80 illustrated in FIGS. 4A and 4B is not limited to a vertical direction, and the positional relationship is also generated in a horizontal direction in the same way. In this embodiment, as illustrated in FIG. 1, one imaging unit 51 disposed in the main body of the projector 10 which is positioned on an upper side of the screen SC captures the screen SC from above, and thus the shift of the distance G2 is generated in both of the vertical direction and the horizontal direction.

Therefore, when the indication position of the indicator 80 is detected, the projector 10 detects the indication position similar to a case of detecting the indication position of the indicator 70, and then corrects the detected position.

Specifically, the calibration control unit 39 performs the calibration relevant to the detection of the indication position of the indicator 70, and creates the calibration data. In a case where the calibration data is used, for example, as illustrated in FIG. 4A, the indication position is able to be detected with high accuracy when the light emitting position 70a is close to the contact point 70b with the screen SC.

Further, when the indication position of the indicator 80 is detected, the projector 10 uses correction data correcting the coordinates obtained by the calibration data. Specifically, the correction data is initial correction data 125 and manual correction data 126.

The correction data may be data setting the distance G1 of FIG. 4B. In this case, the correction data is able to be a table or map data which associates data indicating a size of the distance G1 with each of coordinates on the captured image data or coordinates on the projected image. In addition, the correction data is able to be a table which associates a representative point which is set in advance in the coordinates on the captured image data or the coordinates on the projected image with the data indicating the size of the distance G1. When the size of the distance G1 of the coordinates separated from the representative point is required to be obtained, a method in which the distance G1 of the adjacent representative point is applied to coordinates of a correction target, or a method in which the distance G1 of the coordinates of the correction target is obtained from the distance G1 from the representative point by an interpolation operation is able to be used.

In addition, for example, the correction data may be data allowing the coordinates detected by the captured image data, or projected image coordinates which are obtained on the basis of the calibration data to shift. Specifically, the correction data may be data setting a shift amount of the coordinates, and may be a function of correcting the coordinates. In addition, the correction data is able to be data realizing a different shift amount for each of coordinates on the captured image data or coordinates on the projected image. In this case, the correction data may be a table associating the coordinates of the correction target with the shift amount of the coordinates. The table may associate the representative point selected from the coordinates on the captured image data or the coordinates on the projected image with the shift amount. When coordinates other than the representative point are corrected, a method in which the shift amount of the adjacent representative point is applied to the coordinates of the correction target, or a method in which the shift amount of the coordinates of the correction target are obtained from the shift amount of the representative point by an interpolation operation is able to be used.

The calibration control unit 39 is able to execute automatic calibration and manual calibration as the calibration relevant to the indication position of the indicator 70.

The automatic calibration is a process in which an image for automatic calibration is projected onto the screen SC, the image is captured by the imaging unit 51, and the calibration data is created by using the captured image data. The automatic calibration is a process which is able to be automatically executed by the projector 10, and does not require manipulation of the indicators 70 and 80 by the user. The automatic calibration is not limited to a case where the user indicates execution of the calibration by the remote controller or the manipulation panel 19, and is able to be executed at a timing of controlling of the control unit 30. For example, the automatic calibration may be performed when an operation is started, for example, immediately after a power source of the projector 10 is turned ON, and may be performed during a normal operation described later. An automatic calibration image 121 projected in the automatic calibration is stored in the storage unit 110 in advance.

Figure 5:
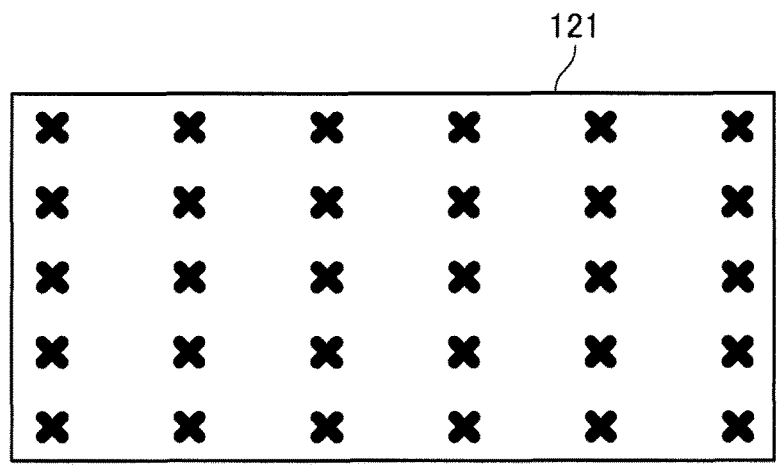
FIG. 5 is a diagram illustrating an example of an automatic calibration image.

FIG. 5 illustrates an example of the automatic calibration image 121. In the automatic calibration image 121, a plurality of marks are arranged at a predetermined interval.

Figure 6:
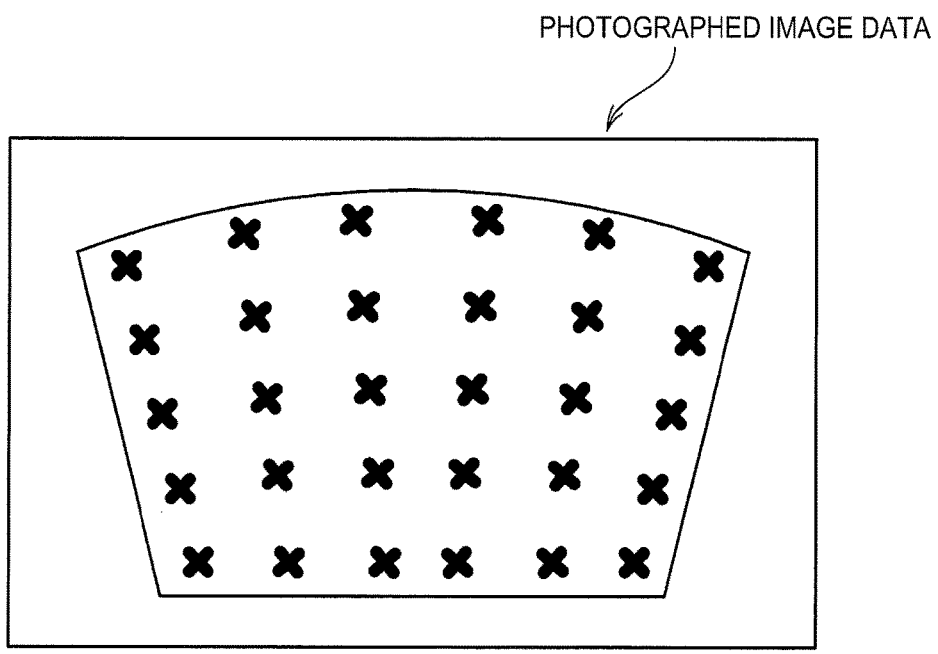
FIG. 6 is a diagram illustrating an example of captured image data which is obtained by capturing the automatic calibration image projected onto a screen.

FIG. 6 illustrates an example of the captured image data which is obtained by capturing the automatic calibration image 121 projected onto the screen SC. When the projector 10 is disposed to be suspended as illustrated in FIG. 1, the captured image data of the imaging unit 51 is captured from obliquely above the screen SC, and thus becomes a distorted image. In FIG. 5, a rectangular automatic calibration image 121 in which the marks are lined up at an equal interval is exemplified, and an image having a distorted shape is captured in the captured image data of FIG. 6, and there are differences in intervals between the marks lined up in the image according to a position of the mark.

The calibration control unit 39 operates the image processing unit 40 and the projection unit 20 by a function of the projection control unit 31 on the basis of the automatic calibration image 121 stored in the storage unit 110, and projects the automatic calibration image 121 onto the screen SC. The calibration control unit 39 controls the position detection unit 50, allows the imaging unit 51 to execute the capturing, and acquires the captured image data. The captured image data is temporarily stored in a memory (not illustrated) from the capturing control unit 53, and is output to the control unit 30. The calibration control unit 39 detects the marks from the captured image data, and acquires a center position of each mark as coordinate values of the mark. The calibration control unit 39 associates the mark detected from the captured image data and the projected image drawn in the frame memory 44, that is, the mark of the automatic calibration image 121.

The calibration control unit 39 associates coordinate values of the mark in the captured image and coordinate values of the mark in the projected image, and thus prepares the automatic calibration data 123 in a table or a function. The coordinate values in the projected image of the mark of the automatic calibration image 121 are stored in the storage unit 110 with the automatic calibration image 121 in advance, or is stored in the storage unit 110 by being included in the automatic calibration image 121. When the automatic calibration data 123 is stored in advance, the calibration control unit 39 updates the automatic calibration data 123.

The calibration control unit 39 executes one calibration, and prepares or updates one automatic calibration data 123 item. The calibration control unit 39 may use a plurality of automatic calibration images 121 in one automatic calibration. For example, a plurality of automatic calibration data 123 items of which arrangement states of the marks such as the number of marks, a size of the mark, a shape of the mark, and a position of the marks are different from each other may be used by being suitably selected. In this case, the calibration control unit 39 may associate a plurality of times of capturing with the coordinates by using the plurality of automatic calibration data 123 items, may combine obtained association results, and may prepare the automatic calibration data 123 with higher accuracy.

The manual calibration is a process in which an image for manual calibration is projected onto the screen SC, the manipulation of the indicator 70 is detected with respect to the projected image, and manual calibration data is created.

Figure 7:
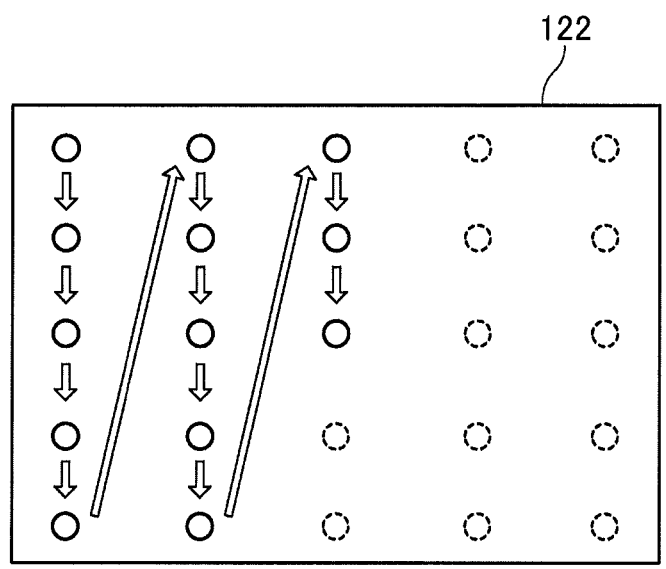
FIG. 7 is a diagram illustrating an example of a manual calibration image.

FIG. 7 illustrates an example of the manual calibration image 122. The manual calibration image 122 includes marks indicating the indication position in order to allow the user to perform the indication by the indicator 70. In the manual calibration image 122 of FIG. 7, a plurality of marks for indication (○ mark) are arranged, and the user indicates the position of the mark by the indicator 70.

The plurality of marks are included in the manual calibration image 122, and the marks are projected onto the screen SC one by one. For this reason, specifically, the manual calibration image 122 is configured by combining a plurality of images having a different number of marks.

The user indicates newly displayed marks by the indicator 70 whenever the mark is displayed on the screen SC. The calibration control unit 39 detects the indication position whenever the user performs the manipulation. Then, the calibration control unit 39 associates the indication position detected by the captured image and the projected image drawn in the frame memory 44, that is, the mark of the manual calibration image 122. The calibration control unit 39 associates the coordinate values of the indication position detected by the captured image data, and the coordinate values of the mark on the projected image, and thus prepares the manual calibration data 124.

The manual calibration data 124 is able to have the same data form as that of the automatic calibration data 123, and is able to be the correction data correcting the automatic calibration data 123. The automatic calibration data 123 is data converting the coordinates on the captured image into the coordinates on the projected image. In contrast, the manual calibration data 124 is data further correcting the coordinates converted by using the automatic calibration data 123.

When the calibration relevant to the detection of the indication position of the indicator 70 is performed, the calibration control unit 39 is able to execute the automatic calibration or the manual calibration. When the storage unit 110 stores automatic calibration data 123 created in the past, the automatic calibration and the manual calibration are able to be selected and executed. Here, when the automatic calibration is executed, the calibration control unit 39 updates the automatic calibration data 123 of the storage unit 110. In addition, when the manual calibration is executed, the manual calibration data 124 is created or updated. In addition, when the automatic calibration data 123 is not stored in the storage unit 110, it is necessary to execute the automatic calibration. This is because the manual calibration data 124 is not able to be used in a state where the automatic calibration data 123 is not stored.

The calibration control unit 39 is able to execute the calibration relevant to the detection of the indication position of the indicator 80 similarly to the manual calibration of the indicator 70. In this case, the calibration control unit 39 creates the manual correction data 126. The manual correction data 126 is used when the indication position of the indicator 80 is detected.

The manual correction data 126 is data correcting the coordinates detected as the indication position of the indicator 70 to the coordinates of the indication position of the indicator 80 as described with reference to FIG. 4B. Regarding the detection of the indication position of the indicator 80, when the manual calibration is not performed, the calibration control unit 39 selects the initial correction data 125. The initial correction data 125 is the correction data when the distance G1 of FIG. 4B is set to an initial value, and is stored in the storage unit 110 in advance. When the light output device 60 is disposed, the distance G1 between the screen SC and the detection light L is adjusted to be, for example, 1 mm to 10 mm, and varies in practice with respect to a plane of the screen SC. The initial correction data 125 is the correction data when the initial value of the distance G1 is assumed to be, for example, 5 mm, and when the initial correction data 125 is used, the indication position of the indicator 80 is able to be detected without performing the manual calibration. When the manual correction data 126 prepared by the manual calibration is used, correction reflecting an in-plane difference in the distance G1 is performed, and thus it is possible to detect the indication position of the indicator 80 with higher accuracy.

That is, when the indication position of the indicator 70 is detected in the position detection of the position detection unit 50, the detection control unit 32 obtains the coordinates of the indication position by using the automatic calibration data 123. Here, when the manual calibration data 124 is stored in the storage unit 110, the coordinates obtained by the automatic calibration data 123 are corrected by the manual calibration data 124, and thus the coordinates of the indication position are obtained.

When the indication position of the indicator 80 is detected, the detection control unit 32 performs correction by the initial correction data 125 or the manual correction data 126 in a process of obtaining the coordinates by using the automatic calibration data 123 or the manual calibration data 124. In other words, the initial correction data 125 and the manual correction data 126 are differential data obtaining the indication position of the indicator 80 from the indication position of the indicator 70.

Figure 3:
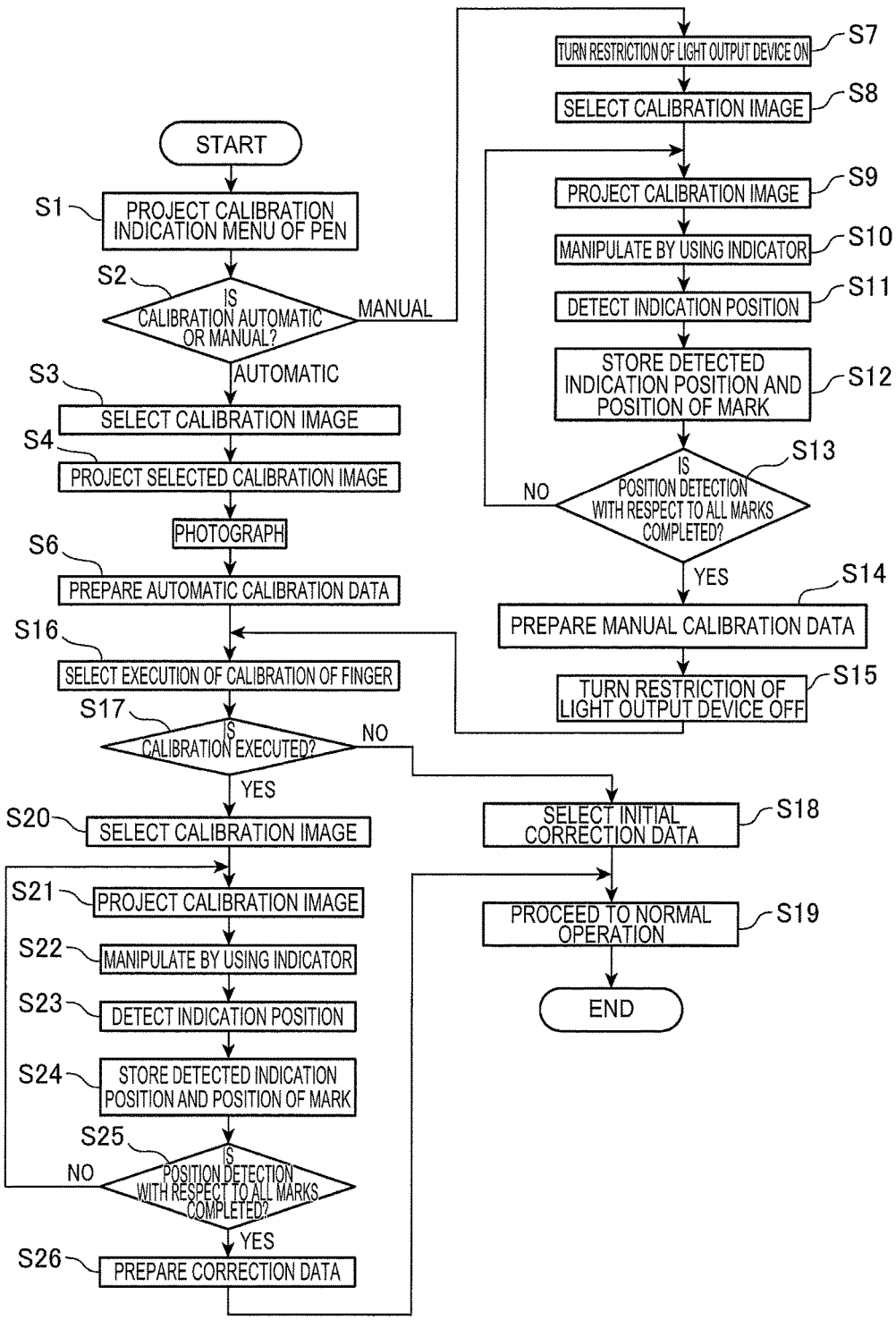
FIG. 3 is a flowchart illustrating an operation of a projector.

FIG. 3 is a flowchart illustrating the operation of the projector 10 relevant to the calibration. In the flowchart of FIG. 3, the calibration control unit 39 projects a menu screen allowing selection of whether the automatic calibration is to be executed, or the manual calibration is executed by the projection unit 20 (Step S1). The calibration control unit 39 detects the manipulation of the remote controller or the manipulation panel 19 (Step S2), and when the automatic calibration is selected, the process of the calibration control unit 39 proceeds to Step S3, and when the manual calibration is selected, the process of the calibration control unit 39 proceeds to Step S7. Furthermore, as described above, when the automatic calibration data 123 is not stored in the storage unit 110, in Step S1, a menu screen in which only the automatic calibration is able to be selected may be projected.

In Step S3, the calibration control unit 39 selects the automatic calibration image 121. In the storage unit 110, a plurality of automatic calibration images 121 are stored. The calibration control unit 39 selects one automatic calibration image 121 among the automatic calibration images 121 stored in the storage unit 110.

Subsequently, the calibration control unit 39 projects the selected automatic calibration image 121 onto the screen SC by the projection unit 20 (Step S4). In a state where the automatic calibration image 121 is projected onto the screen SC, the user may adjust a display size or a display position such that the automatic calibration image 121 is within in a display area of the screen SC by the manipulation of the remote controller or the manipulation panel 19.

The calibration control unit 39 controls the position detection unit 50, executes the capturing by the imaging unit 51 (Step S5), acquires the captured image data of the imaging unit 51, and prepares the automatic calibration data 123 on the basis of the acquired captured image data (Step S6).

In contrast, when the manual calibration is selected, the calibration control unit 39 proceeds to Step S7.

In Step S7, the calibration control unit 39 turns operation restriction of the light output device 60 ON. The operation restriction of the light output device 60 is a process of stopping light emission of the light source unit 61. Specifically, the output control unit 33 controls the output device driving unit 48, and stops the output of the power source and/or the pulse signal to the light source unit 61. The operation restriction is turned ON, and thus the light output device 60 stops the output of the detection light, and the manipulation of the indicator 80 is not detected.

Subsequently, the calibration control unit 39 selects the manual calibration image 122 (Step S8), and projects the selected manual calibration image 122 onto the screen SC by the projection unit 20 (Step S9). In a state where the manual calibration image 122 is projected onto the screen SC, the user may adjust the display size or the display position such that the manual calibration image 122 is within the display area of the screen SC by the manipulation of the remote controller or the manipulation panel 19.

Here, the manipulation using the indicator 70 is performed by the user (Step S10). As illustrated in FIG. 7, predetermined marks are arranged in the manual calibration image 122. When the manual calibration image 122 is displayed on the screen SC, the user uses the indicator 70, and indicates the marks projected onto the screen SC one by one. The transmission unit 52 of the projector 10 periodically transmits the infrared signal for synchronization. The indicator 70 turns the infrared light on by being synchronized with the infrared signal. The calibration control unit 39 allows the imaging unit 51 to capture a capturing range by being synchronized with a light emission timing of the indicator 70. Accordingly, the captured image data (hereinafter, referred to as "first position detection image data") indicated by the indicator 70 is obtained by capturing. The calibration control unit 39 acquires the captured image data, and detects the indication position of the indicator 70 (Step S11).

The calibration control unit 39 associates the indication coordinates of the captured image data detected by the position detection unit 50 and the coordinates on the automatic calibration image 121 of the corresponding mark, and stores the coordinates in the storage unit 110 (Step S12).

The calibration control unit 39 determines whether or not the indication position has been detected with respect to all the marks of the manual calibration image 122 (Step S13), and when there are unprocessed marks, the process of the calibration control unit 39 returns to Step S9.

In addition, when the detection of the indication position of all the marks is completed, the calibration control unit 39 prepares the manual calibration data 124 on the basis of the position of the marks and the coordinates of the indication positions which are temporarily stored in Step S12 (Step S14). The manual calibration data 124 prepared herein is stored in the storage unit 110.

After that, the calibration control unit 39 turns the operation restriction of the light output device 60 OFF (Step S15). That is, the output of the power and the pulse signal from the output device driving unit 48 to the light output device 60 is started by the output control unit 33, and the light output device 60 starts the output of the detection light.

After Step S6 or Step S15, the calibration control unit 39 allows the projection unit 20 to project a user interface allowing selection of whether or not the manual calibration relevant to the detection of the indication position of the indicator 80 is to be executed (Step S16), and selection input of the user is performed.

The calibration control unit 39 detects the manipulation of the remote controller or the manipulation panel 19, and determines whether or not the manual calibration is to be executed (Step S17).

When the manual calibration is not to be executed (Step S17; No), the calibration control unit 39 selects the initial correction data 125 (Step S18), and the calibration control unit 39 proceeds to the normal operation (Step S19).

The normal operation is an operation in which a process according to the indication content is performed by projecting the image onto the screen SC, and by specifying the indication position indicated by the indicators 70 and 80 on the basis of the input image input into the image I/F unit 12.

When the manual calibration relevant to the manipulation of the indicator 80 is to be performed (Step S17; Yes), the calibration control unit 39 selects the manual calibration image 122 (Step S20).

Subsequently, the calibration control unit 39 projects the selected manual calibration image 122 onto the screen SC (Step S21). Here, the manipulation using the indicator 80 is performed by the user (Step S22), and the calibration control unit 39 executes an indication position detection process which detects the indication position of the indicator 70 (Step S23). The indication position detection process of Step S22 is the same process as the indication position detection process of Step S11 described above.

The calibration control unit 39 acquires the coordinates of the indication position from the position detection unit 50, and determines the coordinates as the indication coordinates on the captured image data. Then, the calibration control unit 39 associates the indication coordinates on the captured image data, and the coordinate values of the mark on the manual calibration image 122 of the corresponding mark, and stores the coordinates in the storage unit 110 (Step S24).

The calibration control unit 39 determines whether or not the indication position has been detected with respect to all the marks of the manual calibration image 122 (Step S25), and when there are unprocessed marks, the calibration control unit 39 returns to Step S20. In addition, when the detection of the indication position of all the marks is completed, the calibration control unit 39 prepares the manual correction data 126 on the basis of the coordinates of the indication positions and the position of the marks which are stored in Step S23 (Step S26). The manual correction data 126 prepared herein is stored in the storage unit 110. After that, the calibration control unit 39 proceeds to Step S18, and starts the normal operation.

Furthermore, the calibration control unit 39 may create the manual calibration data 124 including the same data as the automatic calibration data 123 by the manual calibration of the indicator 70. In this case, the calibration control unit 39 creates the same manual calibration data 124 as the automatic calibration data 123 by the processes of Steps S7 to S14 in FIG. 3. In addition, the automatic calibration data 123 and the manual calibration data 124 may be the same data, and in this case, the automatic calibration data 123 created in the past is overwritten by the data created in Step S14.

In this configuration, when the calibration control unit 39 executes any one of the automatic calibration and the manual calibration, it is possible to obtain the coordinates of the indication position of the indicator 70. Accordingly, in Step S2 of FIG. 3, it is possible to select the manual calibration in a state where the automatic calibration data 123 is not stored.

Figure 8:
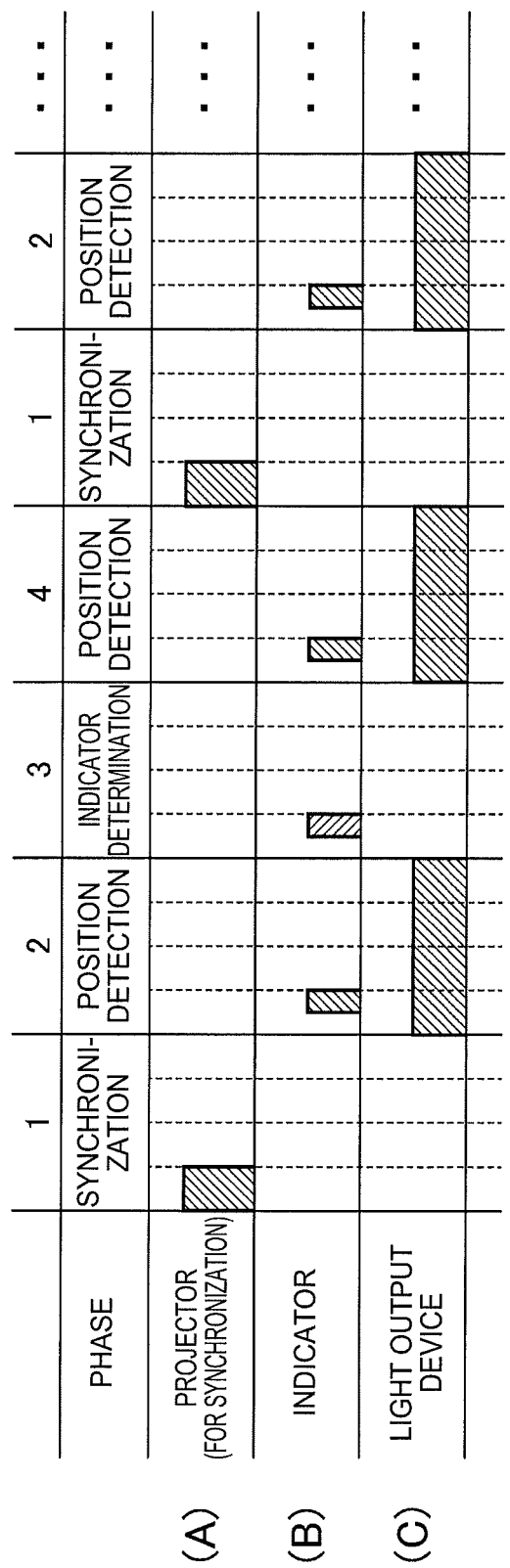
FIG. 8 is a sequence diagram illustrating a light emission timing of each unit.

Next, the transmission unit 52 of the projector 10, the indicator 70, and the light emission timing of the light output device 60 in the normal operation will be described with reference to a sequence diagram illustrated in FIG. 8. In the sequence diagram of FIG. 8, (A) indicates a light emission state of the transmission unit 52, (B) indicates a light emission state of the indicator 70, and (C) indicates a light emission state of the light output device 60. In addition, a horizontal axis of FIG. 8 is a time axis.

As described above, the projector 10 transmits the infrared signal for synchronization from the transmission unit 52 to the indicator 70 by the control of the output control unit 33, and functions as a master device. In addition, the output control unit 33 controls the output device driving unit 48, and adjusts the light emission timing of the light output device 60. The indicator 70 allows the transmission and reception unit 74 to emit light at a predetermined timing on the basis of the infrared signal for synchronization transmitted from the transmission unit 52.

A light emitting sequence of the projection system 1 in this embodiment is configured by four phases of a first phase to a fourth phase, and the first phase to the fourth phase are sequentially repeated. In this embodiment, lengths of the first to fourth phases are set to be the same time. In addition, a first light emitting time of the transmission unit 52 is ¼ of one phase, a first light emitting time of the indicator 70 is ⅛ of one phase, and a first light emitting time of the light output device 60 is one phase, but this is merely an example.

The first phase is a synchronization phase. In the first phase, the transmission unit 52 of the projector 10 emits the light, and transmits the infrared signal for synchronization. The control unit 73 of the indicator 70 detects the infrared signal for synchronization by the transmission and reception unit 74, and recognizes a start timing of the first phase.

The second phase is a phase of the position detection, and the light source unit 61 of the light output device 60 and the transmission and reception unit 74 of the indicator 70 are turned on. The projector 10 allows the imaging unit 51 to capture the capturing range according to the light emission timing of the light output device 60 and the indicator 70. For example, when the imaging unit 51 performs the capturing at a timing when the indicator 70 emits the light in the second phase, the light emission of the indicator 70 and the detection light reflected by the indicator 80 are captured in the captured image. In addition, when the imaging unit 51 performs the capturing at a timing when the indicator 70 does not emit the light, the reflected light from the indicator 80 is captured in the captured image.

A capturing timing and a capturing interval of the imaging unit 51 are set in advance, and the number of capturing times per one phase may be one time or may be a plurality of times. As illustrated in FIG. 8, when the indicator 70 emits the light one time per one phase, at least it is preferable that the capturing be performed at a timing when the indicator 70 emits the light in each phase. In addition, a method of adjusting the capturing timing of the imaging unit 51 and the light emission timing of each unit is arbitrary. In general, the capturing timing and the capturing interval of the imaging unit 51 may not be easily changed, and thus the output control unit 33 may adjust a light emission timing of the transmission unit 52 in consideration of the capturing timing of the imaging unit 51.

The third phase is a phase of indicator determination. In the third phase, the indicator 70 emits the light, and the light output device 60 does not emit the light. For this reason, in the third phase, the imaging unit 51 captures the image of the light emitted from the indicator 70 in the captured image, and does not capture the reflected light from the indicator 80.

The fourth phase is a phase of the same position detection as that of the second phase, and the light source unit 61 of the light output device 60 and the transmission and reception unit 74 of the indicator 70 are turned on.

Accordingly, by comparing the captured image of the third phase with the captured image of the second phase and the fourth phase, the detection control unit 32 is able to identify whether the image of the light captured in the captured image of the second phase and the fourth phase is the image of the light of the indicator 70 or the image of the reflected light from the indicator 80. When the length of the time of each phase is sufficiently shortened, the positions of the images captured in the captured image of the successive second, third, and fourth phase are close to each other. For this reason, the light of the indicator 70 and the reflected light from the indicator 80 are easily identified.

Further, when a plurality of indicators 70 are used in the projection system 1, it is possible to identify the light emission of each of the indicators 70 in the captured image of the imaging unit 51. That is, different light emission timings may be set with respect to each of the indicators 70 in advance. Specifically, whether or not the light is emitted in the third phase may be set for each indicator 70. For example, in a first indicator 70, light emission/light non-emission of the third phase is set to "1000" ("1" indicates light emission, and "0" indicates light non-emission) while the first to the fourth phases are executed four times. In a second indicator 70, light emission/light non-emission of the third phase is set to "1010" while the first to the fourth phases are executed four times. In this case, by comparing four captured images of the third phase which are captured while the first to the fourth phases are executed four times, it is possible to identify the first indicator 70 and the second indicator 70.

As described above, the projector 10 according to the embodiment to which the invention is applied includes the light output device 60 which outputs the detection light along the screen SC, the position detection unit 50 which detects the indication position, and the calibration control unit 39. The position detection unit 50 performs a first detecting operation which detects the indication position by using the detection light, and a second detecting operation which detects the indication position by using the light other than the detection light. The calibration control unit 39 executes the calibration associating the position of the indicator 70 detected in the second detecting operation with the position on the screen SC, and restricts the output of the detection light while the calibration is executed. Accordingly, when the second detecting operation of detecting the indication position by using the light other than the detection light, that is, the calibration relevant to the position detection of the indicator 70 is performed, the detection light does not influence the calibration. For this reason, in a configuration where the indication position is able to be detected by a plurality of different methods, it is possible to suitably execute the calibration.

In addition, the calibration control unit 39 detects an actual indication position by using the light other than the detection light, for example, the light emission of the indicator 70, and thus executes the manual calibration associating the position detected in the second detecting operation with the position on the screen SC. Then, the output of the detection light is restricted while the manual calibration is executed. For this reason, when the indication position is detected during the calibration relevant to the manipulation of the indicator 70, it is possible to prevent the detection light from having influenced.

In the first detecting operation, the position detection unit 50 detects the indication position of the first indicator on the basis of the reflected light reflected by the indicator 80 (the first indicator) which reflects the detection light. In addition, in the second detecting operation, the position detection unit 50 detects the indication position of the second indicator on the basis of the light emitted by the indicator 70 (the second indicator) having a light emitting function. For this reason, both of the indication position of the indicator 80 which does not emit the light and the indication position of the indicator 70 having the light emitting function are able to be detected using the light. Accordingly, the plurality of indicators of which the detecting methods are different from each other are used in combination with each other, and thus it is possible to suitably execute the calibration.

In addition, in a normal operation mode where the position detection unit 50 is operated according to the indication position of the indicator 70 and the indicator 80, the output control unit 33 allows the light output device 60 to intermittently emit the light in a light emitting pattern different from the light emission of the indicator 70. For example, in an example of FIG. 8, a phase where the indicator 70 emits the light and a phase where the light output device 60 emits the light among the respective first to fourth phases are not identical to each other. Accordingly, the reflected light reflected by the indicator 80 and the light emitted by the indicator 70 are able to be discriminated between by the position detection unit 50, and thus it is possible to detect the indication position by discriminating between the plurality of indicators of which the detecting methods are different from each other, and by simultaneously using the plurality of indicators. In addition, the light output device 60 and the indicator 70 emit the light other than light of the visible region, and the position detection unit 50 detects the indication position on the basis of the light other than light of the visible region. By applying the invention to the projector 10 including the projection unit 20 projecting an image onto the screen SC which is a manipulation surface, it is possible to detect the indication position of the indicator 70 and the indicator 80 without influencing visibility of the projected image.

In addition, the projector 10 allows the imaging unit 51 to capture the image projected by the projection unit 20, and the calibration control unit 39 executes the automatic calibration on the basis of the captured image captured by the imaging unit 51 in a state where the automatic calibration image 121 is projected. While the automatic calibration is executed, the output of the light output device 60 is not restricted. Since the automatic calibration uses visible light, the detection light of the light output device 60 does not influence the calibration. For this reason, control for restricting the output of the light output device 60 is not necessary.

Furthermore, the embodiment described above is merely an example of a specific aspect to which the invention is applied, but the invention is not limited thereto, and the invention is able to be applied as a different aspect. In the embodiment described above, a case where the indicator 80 is used as the first indicator, and the indicator 70 emitting the infrared light is used as the second indicator is exemplified, but the invention is not limited thereto. For example, the indicator 70 which is set not to emit the light may be used as the first indicator. In addition, the indicator is not limited to the pen type indicator 70 or the indicator 80 which is the finger of the user, and a laser pointer, an indication rod, and the like may be used, but a shape or a size thereof is not limited. In addition, the marks (symbols) in the automatic calibration image and the manual calibration image are not limited to the aspects or the symbols illustrated in FIG. 5 to FIG. 7. The mark may be a figure which is configured of a plurality of pixels which are able to be extracted from the captured image data.

In addition, in the embodiment described above, a configuration in which the light output device 60 is configured as a body different from the main body of the projector 10, and the light output device 60 is connected by the cable 60a is exemplified, but the invention is not limited thereto. For example, the light output device 60 may be integrally attached to the main body of the projector 10, and may be embedded in the main body of the projector 10. In addition, the light output device 60 may receive power from the outside, and may be connected to the output device driving unit 48 by a wireless communication link.

In addition, in the embodiment described above, a configuration in which the signal for synchronization is transmitted from the projector 10 to the indicator 70 by using the infrared signal emitted by the transmission unit 52 is described, but the signal for synchronization is not limited to the infrared signal. For example, the signal for synchronization may be transmitted by electromagnetic wave communication or ultrasonic wave wireless communication. The configuration is realized by disposing the transmission unit transmitting a signal by the electromagnetic wave communication or the ultrasonic wave wireless communication in the projector 10, and by disposing the same reception unit in the indicator 70.

In addition, in the embodiment described above, the position detection unit 50 captures the screen SC by the imaging unit 51 and specifies the position of the indicator 70, but the invention is not limited thereto. For example, the imaging unit 51 is disposed in the main body of the projector 10, and is not limited to performing the capturing with respect to the projection direction of the optical system for projection 23. The imaging unit 51 may be arranged as a body different from the main body of the projector 10, and the imaging unit 51 may perform the capturing from a side or a front surface of the screen SC. Further, a plurality of imaging units 51 may be arranged, and the detection control unit 32 may detect the position of the indicators 70 and 80 on the basis of the captured image data of the plurality of imaging units 51.

In addition, in the embodiment described above, a configuration in which three transmission type liquid crystal panels corresponding to each color of RGB are used as the light modulating device 22 modulating the light emitted by the light source is exemplified, but the invention is not limited thereto. For example, three reflection type liquid crystal panels may be used, and a method in which one liquid crystal panel and a color wheel are combined may be used. Alternatively, the light modulating device 22 may be configured by a method in which three digital mirror devices (DMD) are used, and by a DMD method in which one digital mirror device and a color wheel are combined. When only one liquid crystal panel or DMD is used as the light modulating device, a member corresponding to a synthesis optical system such as a cross dichroic prism is not necessary. In addition, in addition to the liquid crystal panel and the DMD, a light modulating device which is able to modulate the light emitted by the light source is able to be adopted without any problem.

In the embodiment described above, an aspect in which the user performs the indication manipulation by the indicators 70 and 80 with respect to the screen SC (a projection surface, a display surface) onto which an image is projected (displayed) by a front-projection type projector 10 is described, and the user may perform the indication manipulation with respect to the display screen (the display surface) onto which the image is displayed by a display device (a display unit) in addition to the projector 10. In this case, the light output device 60 or the imaging unit 51 may be integrally configured with the display device, and may be configured as a body different from the display device. As the display device in addition to the projector 10, a rear-projection type projector, a liquid crystal display, an organic Electro Luminescence (EL) display, a plasma display, a cathode-ray tube (CRT) display, a Surface-conduction Electron-emitter Display (SED), and the like are able to be used.

In addition, each functional unit of the projection system 1 illustrated in FIG. 2 indicates a functional configuration, and is not particularly limited to a specific implementation. That is, it is not necessary that hardware individually corresponding to each functional unit be implemented, and one processor execute a program, and thus it is also possible to realize a function of a plurality of functional units. In addition, in the embodiment described above, a part of the function realized by software may be realized by the hardware, or a part of the function realized by the hardware may be realized by the software. In addition, a specific and detailed configuration of each unit in addition to the projection system 1 is able to be arbitrarily changed without departing from the gist of the invention.

What is claimed is:

1. A position detecting device, comprising:
   a light output unit which outputs detection light along a manipulation surface, wherein the light output unit emits light other than light of a visible region, and wherein the position detecting device is a projector including a projection unit which projects an image onto the manipulation surface;
   a detection unit which performs a first detecting operation detecting an indication position by using the detection light, and a second detecting operation detecting an indication position by using light other than the detection light, wherein the detection unit detects an indication position of a first indicator in the first detecting operation on the basis of reflected light reflected by the first indicator reflecting the detection light, and detects an indication position of a second indicator in the second detecting operation on the basis of light emitted by the second indicator having a light emitting function, the detection unit detecting the indication position on the basis of the light other than light of the visible region emitted by the light output unit and light other than light of a visible region emitted by the second indicator;
   a calibration control unit which executes a first calibration associating a position detected in the second detecting operation with a position on the manipulation surface; and
   an imaging unit which captures the image projected by the projection unit,
   wherein the calibration control unit executes a second calibration, the second calibration being an automatic calibration associating the position detected in the second detecting operation with the position on the manipulation surface on the basis of a captured image captured by the imaging unit in a state in which an image for calibration is projected by the projection unit, and
   wherein the calibration control unit restricts output of the detection light while the first calibration is executed, and the output of the detection light is not restricted while the automatic calibration is executed.

2. The position detecting device according to claim 1, wherein the calibration control unit executes, as the first calibration, manipulation type calibration associating the position detected in the second detecting operation with the position on the manipulation surface by detecting a real indication position by using the light other than the detection light, and restricts the output of the detection light while the manipulation type calibration is executed.

3. The position detecting device according to claim 1, wherein the position detecting device is capable of executing a normal operation mode in which the detection unit is operated corresponding to the indication position detected in the first detecting operation and the indication position detected in the second detecting operation, and
   the position detecting device further comprises an output control unit which allows the light output unit to emit light in a light emitting pattern which is different from that of light emission of the second indicator in the normal operation mode.

4. The position detecting device according to claim 1, wherein the detection unit detects the reflected light reflected by the first indicator and the light emitted by the second indicator by a common section.

5. position detecting device according to claim 1, wherein the first calibration is a manual calibration in which a user uses the light other than the detection light to interact with a displayed manual calibration image.

6. A position detecting system, comprising:
   a position detecting device which detects a manipulation position of a first indicator and a second indicator performing a manipulation on a manipulation surface; and
   a light output device which outputs detection light along the manipulation surface, wherein the light output device emits light other than light of a visible region, and wherein the position detecting device is a projector including a projection unit which projects an image onto the manipulation surface,
   wherein the position detecting device includes
      a detection unit which performs a first detecting operation detecting an indication position by using the detection light, and a second detecting operation detecting an indication position by using light other than the detection light, wherein the detection unit detects an indication position of a first indicator in the first detecting operation on the basis of reflected light reflected by the first indicator reflecting the detection light, and detects an indication position of a second indicator in the second detecting operation on the basis of light emitted by the second indicator having a light emitting function, the detection unit detecting the indication position on the basis of the light other than light of the visible region emitted by the light output unit and light other than light of a visible region emitted by the second indicator, and
      a calibration control unit which executes a first calibration associating a position detected in the second detecting operation with a position on the manipulation surface, and
   an imaging unit which captures the image projected by the projection unit,
   wherein the calibration control unit executes a second calibration, the second calibration being an automatic calibration associating the position detected in the second detecting operation with the position on the manipulation surface on the basis of a captured image captured by the imaging unit in a state in which an image for calibration is projected by the projection unit, and
   wherein the calibration control unit restricts output of the detection light while the calibration is executed, and the output of the detection light is not restricted while the automatic calibration is executed.

7. The position detecting system according to claim 6, wherein the first calibration is a manual calibration in which a user uses the light other than the detection light to interact with a displayed manual calibration image.

8. A controlling method of a position detecting device, the position detecting device being a projector including a projection unit which projects an image onto a manipulation surface, the method comprising:
   outputting detection light along the manipulation surface, the detection light being light other than light of a visible region; and
   performing a first detecting operation detecting an indication position by using the detection light, and a second detecting operation detecting an indication position by using light other than the detection light, wherein the first detecting operation detects an indication position of a first indicator on the basis of reflected light reflected by the first indicator reflecting the detection light, and the second detecting operation detects an indication position of a second indicator on the basis of light emitted by the second indicator having a light emitting function, the indication position being detected on the basis of the light other than light of the visible region emitted by the light output unit and light other than light of a visible region emitted by the second indicator; and capturing an image projected by the projection unit, wherein a first calibration associating a position detected in the second detecting operation with a position on the manipulation surface is executed, a second calibration is executed, the second calibration being an automatic calibration associating the position detected in the second detecting operation with the position on the manipulation surface on the basis of the captured image in a state in which an image for calibration is projected by the projection unit, output of the detection light is restricted while the calibration is executed, and the output of the detection light is not restricted while the automatic calibration is executed.

9. The controlling method according to claim 8, further comprising:

displaying a manual calibration image, wherein the first calibration is a manual calibration in which a user uses the light other than the detection light to interact with the displayed manual calibration image.

* * * * *